(12) United States Patent
Estrada, III et al.

(10) Patent No.: US 7,557,734 B2
(45) Date of Patent: Jul. 7, 2009

(54) AIRBORNE VISIBILITY INDICATOR SYSTEM AND METHOD

(75) Inventors: Arthur Estrada, III, New Brockton, AL (US); James L. Persson, Enterprise, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 282 days.

(21) Appl. No.: 11/547,683

(22) PCT Filed: Apr. 5, 2005

(86) PCT No.: PCT/US2005/011188

§ 371 (c)(1),
(2), (4) Date: Oct. 5, 2006

(87) PCT Pub. No.: WO2006/049643

PCT Pub. Date: May 11, 2006

(65) Prior Publication Data

US 2008/0165031 A1 Jul. 10, 2008

Related U.S. Application Data

(60) Provisional application No. 60/563,896, filed on Apr. 5, 2004.

(51) Int. Cl.
*G08B 23/00* (2006.01)
(52) U.S. Cl. .................. 340/963; 340/601; 340/945; 356/5.05; 356/342; 701/9
(58) Field of Classification Search .......... 340/945, 340/963–980; 701/3–14; 342/65, 26
See application file for complete search history.

(56) References Cited

U.S. PATENT DOCUMENTS

| 3,510,225 A | 5/1970 | Collis |
| 4,394,575 A | 7/1983 | Nelson |
| 4,520,360 A | 5/1985 | Schwab |
| 4,874,572 A | 10/1989 | Nelson et al. |

(Continued)

FOREIGN PATENT DOCUMENTS

WO    WO 94/08254    4/1994

OTHER PUBLICATIONS

Estrada, Arthur, et al., "A Proof of Concept of an Airborne Visibility Indicator", USAARL Report No. 2004-15, Apr. 2004.

(Continued)

*Primary Examiner*—Brent Swarthout
(74) *Attorney, Agent, or Firm*—Elizabeth Arwine

(57) ABSTRACT

A system for providing an objective visibility measurement to a flight crew preferably includes a LIDAR system (100), an evaluation unit (150), and a crew interface (200). In at least one embodiment, the system includes the capability of compensating for aircraft turns such that the absolute direction of the visibility reading remains constant through the maneuver. A method for providing an objective visibility reading to a flight crew preferably includes tacking a visibility reading (S820, S920); providing the visibility reading to the flight crew (S830, S930); and notifying the flight crew when the visibility has decreased to and/or less than a minimum visibility threshold (S840).

20 Claims, 8 Drawing Sheets

U.S. PATENT DOCUMENTS

| | | |
|---|---|---|
| 5,116,124 A | 5/1992 | Hüttmann |
| 5,285,256 A | 2/1994 | Nelson et al. |
| 5,504,577 A | 4/1996 | Lönnqvist et al. |
| 5,546,183 A | 8/1996 | Fegley et al. |
| 5,663,710 A | 9/1997 | Fasig et al. |
| 5,914,776 A | 6/1999 | Streicher |
| 6,208,938 B1 | 3/2001 | Doerfel |
| 6,330,519 B1 | 12/2001 | Sawatari |
| 6,362,773 B1 | 3/2002 | Pöchmüller |
| 6,381,538 B1 | 4/2002 | Robinson et al. |
| 6,498,647 B1 | 12/2002 | Kuehnle |
| 6,556,282 B2 | 4/2003 | Jamieson et al. |
| 6,867,710 B2 | 3/2005 | Wobben |

OTHER PUBLICATIONS

Ophir Corp., "Pilot Alret System (PAS)", www.ophir.com/pilot_alert_system.htm, printed on Mar. 29, 2005.

Springer, Ben, "The IFR Bullet:", Air Medical Journal, Jan.-Feb. 2005, vol. 24:1, pp. 29-31.

AIRBORNE VISIBILITY INDICATOR SYSTEM AND METHOD

I. FIELD OF THE INVENTION

This invention relates to a system and method for objectively determining current visibilities during flight to assist in the determination of whether a minimum required visibility is present to continue with the current flight plan and/or mission.

II. BACKGROUND OF THE INVENTION

There is a fundamental problem in aviation that until recently was not recognized as being the source of pilot error. The problem is that it is extremely difficult to subjectively determine visibility range during flight accurately. As such, pilots are prone to fly into poor visibility situations and not realize it until it is too late. For general aviation such as small planes, there typically is no equipment in the aircraft to allow for instrument flying (because of the cost of the equipment), which results in the pilot gambling he/she will be lucky and is able to fly into better visibility conditions before crashing. This is less of an issue on larger aircraft, because they typically operate under instrument flight rules since these aircraft have equipment that allows instrument flying when visibility decreases and/or becomes difficult to judge such as at night and/or over large bodies of water.

Every year, military and civilian aviation lose lives and aircraft due to the spatial disorientation experienced during periods of minimal visibility or inadvertent entry into instrument meteorological conditions. The flights sometimes end catastrophically when the aircraft flies into an unseen terrain such as a mountain or other unyielding surface.

Spatial disorientation occurs ". . . when the aviator fails to sense correctly the position, motion, or altitude of his aircraft or of himself within the fixed coordinate system provided by the surface of the earth and gravitational vertical." Benson, *Spatial Disorientation: General Aspects*, Aviation Medicine, 1978. Spatial disorientation remains an important source of attrition in aviation. U.S. Army Field Manual 3-04.301 (Department of the Army, 2000), Aeromedical Training for Flight Personnel, states that, "[s]patial disorientation contributes more to aircraft accidents than any other physiological problem in flight." Regardless of their flight time or experience, all aircrew members are vulnerable to spatial disorientation. According to a Federal Aviation Administration technical report (Kirkham et al., *Spatial Disorientation in General Aviation Accidents*, FAA Civil Aeromedical Institute, Report No. FAA-AM-78-13, 1978), for all fatal accidents in small fixed-wing aircraft from 1970 through 1975, 22.2% involved continued flight into adverse weather while operating under VFR (visual flight rules) and 16.4% were attributed to spatial disorientation. According to the U.S. Army Safety Center (USASC) accident files and a report published by the U.S. Army Aeromedical Research Laboratory (USAARL) (Braithwaite, et al., *Spatial Disorientation in U.S. Army Helicopter Accidents: An Update of the 1987-92 Survey to Include 1993-95*, U.S. Army Aeromedical Research Laboratory, USAARL Report No. 97-13, 1997), spatial disorientation was considered to be a significant factor in 291 (30 percent) of Class A, B and C helicopter accidents in the U.S. Army between 1987 and 1995. According to the report, during this time, 110 lives were lost and a cost of nearly $468 million was incurred. The monetary cost of spatial disorientation is high and the fatality rate is between one and one-half to two times that of nondisorientation accidents.

Preliminary results of a review of spatial disorientation accidents for fiscal years (FY) 1996 through 2000 showed similar trends with reviews by Durnford et al., *Spatial Disorientation: A Survey of U.S. Army Helicopter Accidents 1987-1992*, U.S. Army Aeromedical Research Laboratory, USAARL Report No. 95025, 1995 and Braithwaite, et al. (1997). It was further stated that data comparison with fiscal years 1991 through 1995 showed that the spatial disorientation accident rate is not decreasing, and if anything, since 1995, has slowly started increasing. This trend indicates that despite the best efforts of the USASC to educate the aviator through printed accident reviews and the efforts of the developers of improved aircraft orienting technology (cockpit head-up displays, improved night vision devices, global positioning navigation systems, etc.), there has been little change in the spatial disorientation accident rate.

Over the past six years, weather and spatial disorientation has caused 21% of all accidents and 49% of the fatal crashes involving lifesaver flights. Springer, *The IFR Bullet*, Air Medical Journal, Vol. 24, No. 1, January-February 2005. It is estimated that if the weather related accidents were eliminated, then the accident rate (per 100,000 hours) would go from 6 down to 4 while cutting the fatal crash rate in half from 2 to 1.

In the last two years, there was a multiple helicopter NVG long range surveillance corps extraction training insertion conducted by the U.S. Army. The terrain flight was under zero illumination, no visible horizon and unknown weather, which led to a situation involving spatial disorientation and a controlled flight into terrain resulting in four fatalities and a total cost of $8.4 million.

An important action required by pilots in order to maintain situation awareness and avoid visual conditions likely to cause spatial disorientation is to correlate actual enroute visibility with the minimum visibility required for a particular class of airspace or with a mission's minimum visibility as an abort criterion.

Visibility is one of the most complicated of all meteorological elements to determine during flight. The measure of visibility and visual range depends on the characteristics of the atmosphere, the type of viewing instrument, the type of object or light being detected, and the manner by which the object or light is being viewed. The primary factors influencing visibility include: reflecting power and color of the object, reflecting power of the background, amount of scattering and absorbing particles, position of the sun, angular size of the object, nature of the terrain between the object and observer, contrast of the object, and intensity of the light source.

In the case of classes of airspace that allow VFR flight as defined in the Federal Aviation Regulations (U.S. Government, 2003), when flying VFR, it is incumbent on aviators to maintain at least the minimum visibility required for that airspace. The Federal Aviation Regulations issued by the Federal Aviation Administration (FAA) establish rules under which pilots must operate depending on the class of airspace through which they are flying. U.S. pilots must comply with host nation rules when operating in foreign airspace. In the continental United States, there are six classes of airspace that depend upon the class of aircraft, the altitude being flown, and geographical location. In addition to vertical and horizontal dimensions, a regulatory factor of these classes of airspace is the minimum visibility required within each specific class in order to remain legal. As an example, any pilot flying under VFR in Class G airspace below 1200 feet above ground level (AGL) must maintain 0.5 statute mile (sm) visibility during the day (1 statute mile at night) to comply. In a combat/tactical situation, where flight operations are not subject to FAA regulations or host nation rules, the aviation mission commander establishes the minimum visibility requirement.

It is, therefore, incumbent on the pilot to determine if he/she is complying with the relevant regulations by estimating the predominant visibility during the conduct of a VFR flight. Because these visibility estimates (subjective assessments) vary widely from pilot to pilot, some pilots actually overestimate the predominant visibility. This overestimation causes some pilots, at a minimum, to violate regulations. At worst, it may lead a pilot to become spatially disoriented due to the loss of visual references and can result (and has resulted) in a CFIT (controlled flight into terrain) accident.

During tactical missions, especially at night involving multiple aircraft, when civil visual flight rules may not apply or may be too lenient, an aviation unit commander, or his/her representative, must establish a set of criteria that requires the mission to be aborted should any of the criteria be met during the conduct of the mission. Examples of these criteria are maximum wind velocities, minimum cloud levels, enemy detection and concentrations, equipment malfunctions, and atmospheric visibility. The commander bases these criteria on objective and subjective assessments of his/her unit. Hence, different units have different criteria. Obviously, if a mission required at least three aircraft and all but two malfunctioned, the mission abort criterion for the number of aircraft would be met and the mission would have to be aborted (objective criterion). On the other hand, the commander must establish subjective criteria, also. In establishing these subjective abort criteria, the commander, for example, would determine the minimum/maximum conditions under which he/she believes that the aircrews of that unit would be able to successfully complete a given mission. Certainly, a highly trained, experienced, group of aviators would be able to perform and complete a mission under more difficult and demanding conditions than a group of less experienced aviators. Frequently, these mission abort criteria are incorporated in the unit's standing operating procedures (SOPs) and are standardized for consistency, clarity and brevity. These criteria always, and necessarily, include the minimum atmospheric visibility required for a mission.

Therefore, it is a duty of the pilot-in-command in a single-aircraft mission or of the air mission commander in a multi-aircraft operation to determine the prevailing visibility (greater than 180° of the horizon), or at least the visibility of the sector through which they are traveling (a 45° arc of the horizon circle), during the conduct of a mission to ensure that the minimum visibility for that mission has not been exceeded. U.S. Army rotary-wing pilots have always had to use their judgment and experience to subjectively assess the enroute visibility during a flight. Every aviator has struggled at some point during his/her career to meet VFR and/or mission minimum visibility requirements. As weather deteriorates, the pilot must rely on his/her subjective analysis to formulate a course of action: to proceed, alter, or abort the mission. Often, the aircrews proceed into these potentially dangerous conditions, not because the crews are negligent or irresponsible, but because of an honest effort to accomplish the mission and because there is no sure way to know the exact visibility during the flight, especially at night and/or while using night vision goggles (NVGs).

The pilot's ability to estimate visibility during flight comes through experience. During initial pilot training, the aviator does not receive a formal course of instruction in estimating atmospheric visibilities. He/she learns this skill through mentorship and trial and error. Most aviators rely on the ability to see a known object through the visual obscuration and attempt to judge the distance, which is extremely difficult at night and nearly impossible when flying over large bodies of water. Some aviators use relative distances and/or map cross-referencing (plotting one's position and measuring distance to the visual object). These estimates can vary widely from one aviator to another within the same aircraft or from aircrew to aircrew within a multi-aircraft formation.

The difficulty in estimating visibility with any degree of accuracy is due to the many variables involved. Of course, the absence of standardized formal training is one contributing factor. Other factors include the pilot's own visual acuity and contrast sensitivity of the pilot's eye, and the variance in the contrast sensitivity causes a large variance in estimation of visibility. It is well known that contrast sensitivity is impacted by the angular dimension and brightness, on the age and degree of training of the observers and a number of other factors. Although small in aviation, some differences do exist in each aviator's ability to focus and perceive distant images. Additionally, some pilots are more inclined to make rapid judgments based on their perceptions while others are more patient and thoughtful. The complicating effects of the NVGs, due to their monochromatic nature (shades of green), cause contrasts to be less noticeable. NVGs' ability to amplify light allows some obscurations to be easily "seen through" thus reducing the contrast sensitivity in what the pilot sees.

As a group, it is likely that meteorologists are the most experienced and proficient at estimating prevailing and sector visibility using eyesight. Visibility observations are made on the basis of normal vision, i.e., without the aid of optical devices such as binoculars or telescopes. Observations are made at an eye level of six feet above the ground (an internationally recommended practice). Observers are to select markers (objects) such as buildings, chimneys, hills, trees, and towers that are at verified distances and, thus, if the object is visible, there exists at least that distance of visibility. Although the above-described procedure is accepted as accurate, the reported areas are limited to those areas that are actually observed and, for example, are not necessarily predictive of the areas along a 100-mile flight path. Because these observations are determined by human evaluation, the information itself may be flawed due to different contrast sensitivities.

In order to eliminate the inherent human errors delineated previously and to provide objective visibility data, instruments can be, and are, used to determine visual ranges. According to Lujetic, *A Report on Atmospheric Obstructions to Visibility*, U.S. Army Engineer Topographic Laboratories, Report No. ETL-0169, 1979, there are a number of land based instruments developed and used for the measurement of visual range. The basic attenuation mechanisms are scattering and absorption. Scattering is the process by which a particle in the path of an electromagnetic wave continuously abstracts energy from the path incident wave and reradiates that energy. Absorption is the process by which agents in the atmosphere abstract energy from a light wave. These measuring instruments can be separated into general categories: 1) those that measure the scattered light by sampling a small volume of air using a source and receiver, and 2) those that determine the transmittance of a path of known length using a light source and a telephotometer. Back-, side-, and forward-scatter meters are examples of the first type; and transmissometers are examples of the second.

The instruments above are generally used in fixed applications, i.e., at airports or weather observing stations. In other words, these instruments are stationary and measure the visual range (presence of obscurations) over fixed distances. In applications involving a moving instrument, however, as would be necessary if mounted to an aircraft operating at high airspeeds, other instrument configurations and capabilities must be considered. The U.S. Air Force has offered the opinion that as with fixed applications, the instrument would have to have the capability of determining the visual range under many conditions of precipitation (drizzle, rain, snow, snow grains and pellets, ice crystals and pellets, and hail) and obscurations (mist, fog, smoke, volcanic ash, dust, sand, and haze).

The term LIDAR is an acronym for light detection and ranging. LIDAR systems employ intense pulses of light, typically generated by lasers, and large telescopes and sensitive optical detectors to receive the reflected pulses. They are most commonly used to measure the composition and structure of the atmosphere, such as by tracking weather balloons, smoke puffs, reflections and scattering effects of clouds, and rocket or aircraft trails. The very narrow beam width, narrow line width, and ultra short pulses of the laser make it possible to optically probe the atmosphere with exceptional sensitivity and resolution.

A LIDAR system essentially consists of three main components: a transmitter to emit a laser light, a receiver to collect the backscattered radiation, and converter electronics to produce an interpretable signal from the collected amount of light.

Even though LIDAR has been used by the U.S. Air Force and NASA to evaluate a wide variety of atmospheric properties such as turbulence, pollution and wind shear, and the existence of contrails behind aircraft. To the knowledge of the inventors, there is not a commercially available LIDAR system for determining visibility ranges from aircraft.

Without objective criteria, a pilot will want to do everything in their power to complete a flight or mission, and may as a result push the visibility envelope to avoid abandonment of the flight or mission based on a subjective measure that the pilot was never trained to make but only learned through experience. As such, a need exists to provide an objective measure regarding visibility and the ability to have a pilot alert mechanism when the current visibility has deteriorated below a predetermined visibility threshold.

Notwithstanding the usefulness of the above-described systems and methods, a need still exists for an objective determination of visibility for use by a flight crew to determine whether they should abort a particular flight plan and/or mission.

III. SUMMARY OF THE INVENTION

This invention provides a system and method for assisting flight crews in determining objectively the current visibility conditions during flight in substantially real-time while reducing analysis and discussion that act as a distraction to carrying out a particular flight plan and/or mission.

In at least one embodiment according to the invention, an airborne visibility indicator system includes a LIDAR system, and a flight crew interface connected to the LIDAR system, the flight crew interface includes a controller connected to the LIDAR system, and a display interface connected to the LIDAR system and the controller.

In at least one embodiment according to the invention, an airborne visibility indicator system for use in an aircraft operated by a flight crew, the system includes beam control means for receiving selection of a direction and an elevation to take a visibility reading, visibility calculation means for calculating the visibility reading in the selected direction and at the selected elevation, and display means for displaying the calculated visibility reading, the direction of the visibility reading, and the elevation of the visibility reading.

In at least one embodiment according to the invention, an airborne visibility indicator system for use in an aircraft operated by a flight crew, the system includes beam control means for receiving selection of a direction and an elevation to take a visibility reading, visibility calculation means for calculating the visibility reading in the selected direction and at the selected elevation, display means for displaying the calculated visibility reading, the direction of the visibility reading, and the elevation of the visibility reading, a minimum visibility threshold means for setting the minimum visibility range for a given flight plan and/or mission, and an alarm means for notifying at least one member of the flight crew that the calculated visibility equals the minimum visibility range.

In at least one embodiment according to the invention, a method for providing an airborne visibility indicator to a flight crew, the method includes receiving a minimum visibility threshold, taking a visibility range, providing the visibility reading to the flight crew, and when the visibility reading is less than the received minimum visibility threshold, notifying at least one member of the flight crew of this occurrence.

In at least one embodiment according to the invention, a method for providing an airborne visibility indicator to a flight crew includes receiving a minimum visibility threshold, measuring a visibility range, providing the visibility range to the flight crew, and when the visibility range is less than or equal to the received minimum visibility threshold, notifying at least one member of the flight crew of this occurrence.

In at least one embodiment according to the invention, a method for providing an airborne visibility indicator to a flight crew includes receiving a minimum visibility threshold, receiving a beam elevation and direction, taking a visibility range at the received elevation and direction, providing the visibility range to the flight crew, and when the visibility range is less than the received minimum visibility threshold, notifying at least one member of the flight crew of this occurrence.

In at least one embodiment according to the invention, a method for providing an airborne visibility indicator to a flight crew includes receiving a minimum visibility threshold, receiving a beam elevation and direction, taking a visibility range at the received elevation and direction, providing the visibility range to the flight crew, and when the visibility range is less than or equal to the received minimum visibility threshold, notifying at least one member of the flight crew of this occurrence.

The system includes a LIDAR system that sends out a laser beam from the aircraft in the direction of flight or a pilot selected direction. As this beam of light intersects obscurants in the atmosphere such as smoke, fog and haze, a portion of the light beam is reflected back to the sensor located on the aircraft. By measuring the time difference between transmission and reception of the reflected light, a processing unit of the LIDAR system can determine the range to these obscurants. Secondly, the strength of the reflected beam depends on the degree of back-reflection of the particles in the air. Measuring the power of the returned signal, the LIDAR system calculates a visibility. For example, if a LIDAR beam is sent through a thin haze, only a small amount of light will be reflected back to the sensor, resulting in a greater calculated visual range. Likewise, if the beam is shown through thick fog, much more light will be scattered back to the sensor, resulting in a smaller calculated visibility range.

Therefore, in order to eliminate estimation errors and mitigate the spatial disorientation hazard, the system will provide substantially real-time, objective information to the flight crew during the flight from which he/she could make critical decisions whether to proceed, modify, or abort the mission. The flight crew preferably will receive this visibility information, for example, via a display on the aircraft's instrument panel or head-up display. The system in at least one embodiment will include a digital readout displaying the visibility in statute miles in the direction of the LIDAR beam. The brightness of the digital readout in at least one embodiment is adjustable by a bright/dim control knob in order to set the intensity of the displayed digits. In at least one embodiment, the system provides a readout of the beam's direction in elevation (up and down) and direction (left and right) relative to the aircraft's nose.

Given the following enabling description of the drawings, the system and method should become evident to a person of ordinary skill in the art.

IV. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention, but is used to illustrate the output of light and its reflection if any.

Figure 8:
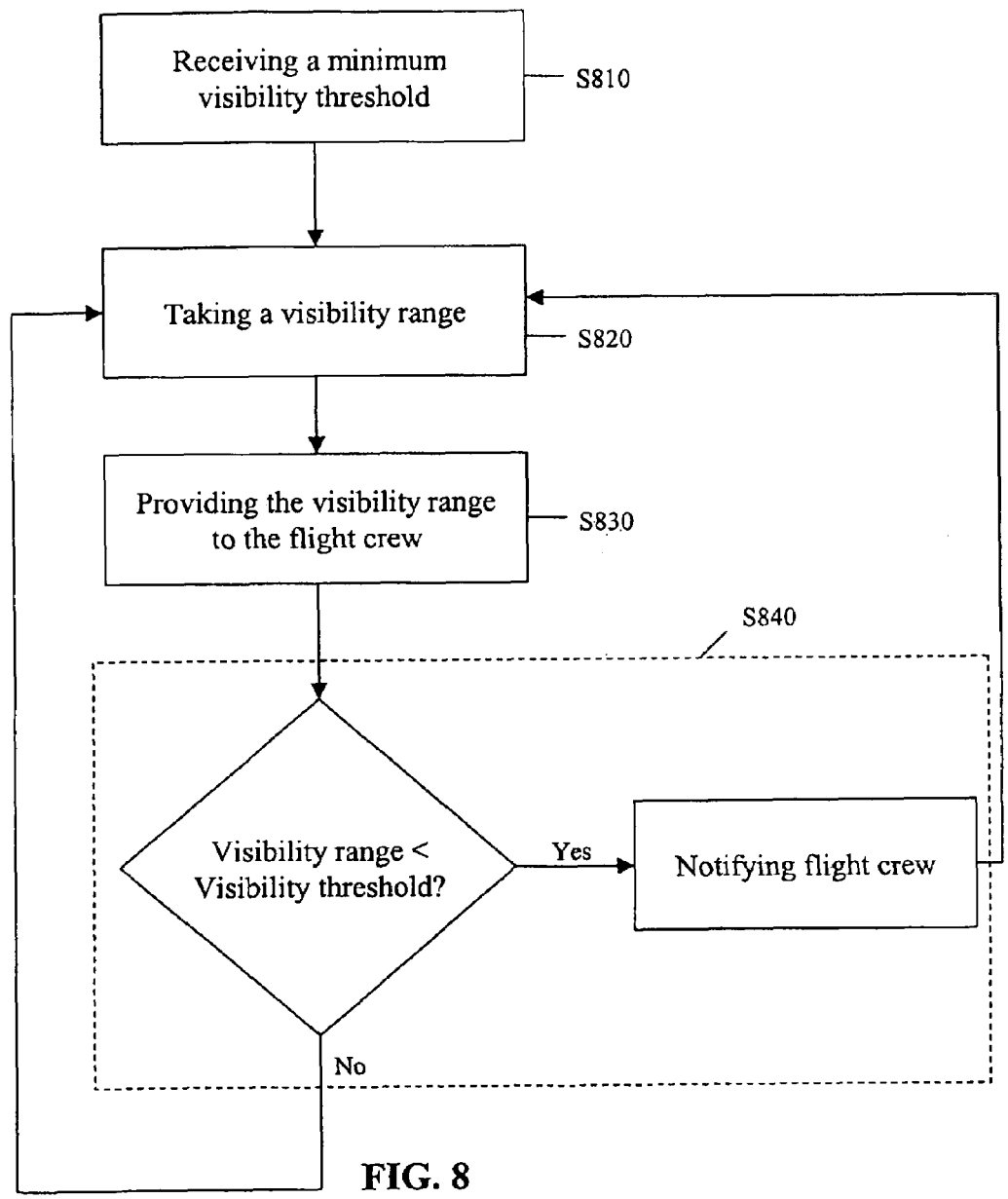
Figure 9:
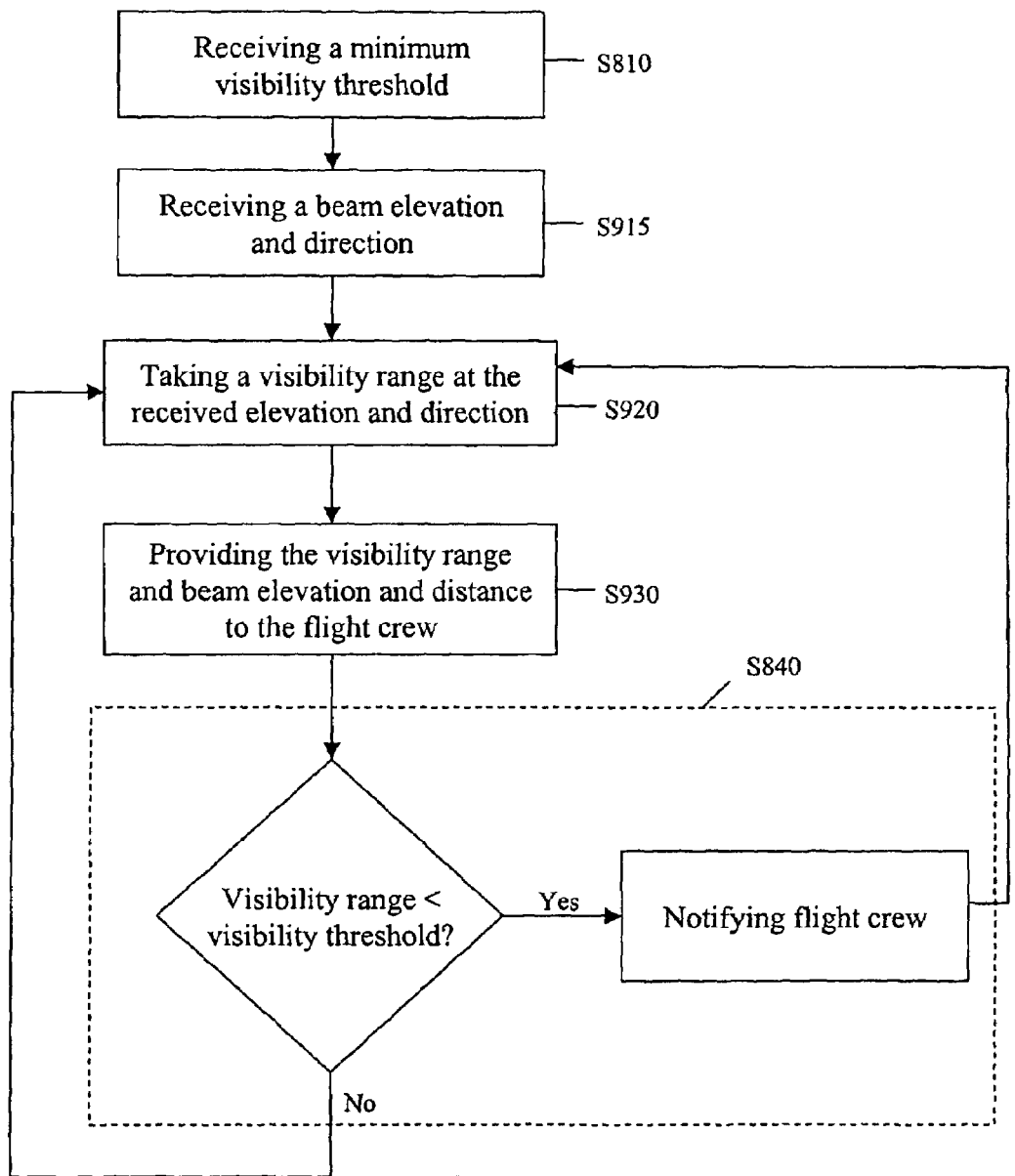

FIGS. 8 and 9 illustrated exemplary flowcharts according to the invention.

V. DETAILED DESCRIPTION OF THE DRAWINGS

The illustrated embodiments of the invention include a system and method for determining when current visibility has deteriorated below a predetermined visibility level during flight operations of an aircraft. An aircraft is defined as including airplanes, gliders, helicopters, dirigibles, hot air balloons, unmanned aerial vehicles (UAV) (including remotely piloted and computer controlled), and the alike. A flight crew is defined as including a pilot, a co-pilot, pilot or co-pilot controlling an aircraft remotely, and/or a computer handling flight operations of an UAV. In at least one embodiment, the system includes visual and/or auditory alarms for at least one member of a flight crew during flight operations. The objective measure of visibility will provide information to the pilot and the rest of the flight crew that can then be used to justify a modification of or to abort the flight plan and/or mission. This objective information may overcome the subconscious resistance to not complete the flight plan and/or mission despite deteriorating visibility, which in turn will save lives and equipment.

Figure 1:
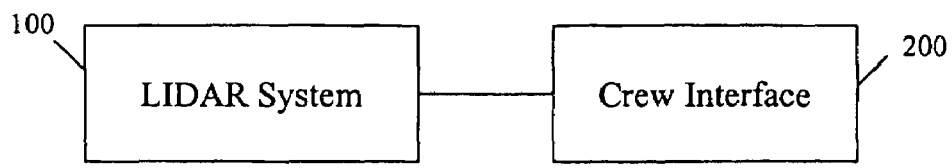
FIG. 1 illustrates a block diagram according to the invention.

FIG. 1 illustrates an exemplary embodiment according to the invention. The illustrated exemplary embodiment includes a LIDAR system 100 and a crew interface 200. The crew interface 200 is how the system interacts with the flight crew such that the flight crew is able to control at least some operations of the LIDAR system 100 and receive information from it such as the current visibility and any warnings. In one exemplary embodiment the crew interface 200 is a means for providing information to the crew from the LIDAR system 100 and the invention includes a variety of ways to control the aiming of the LIDAR beam, for example, as illustrated in FIGS. 3A-3D.

The LIDAR system 100 preferably is located on the front of the aircraft, more preferably in the nose of the aircraft. The crew interface 200 is connected physically (or in wireless communication particularly in a remote piloting arrangement) with the LIDAR system 100. The crew interface 200 preferably is located within the cockpit of the aircraft when the flight crew is present on the aircraft or remotely at a location where the remote flight crew is operating the aircraft.

Figure 2:
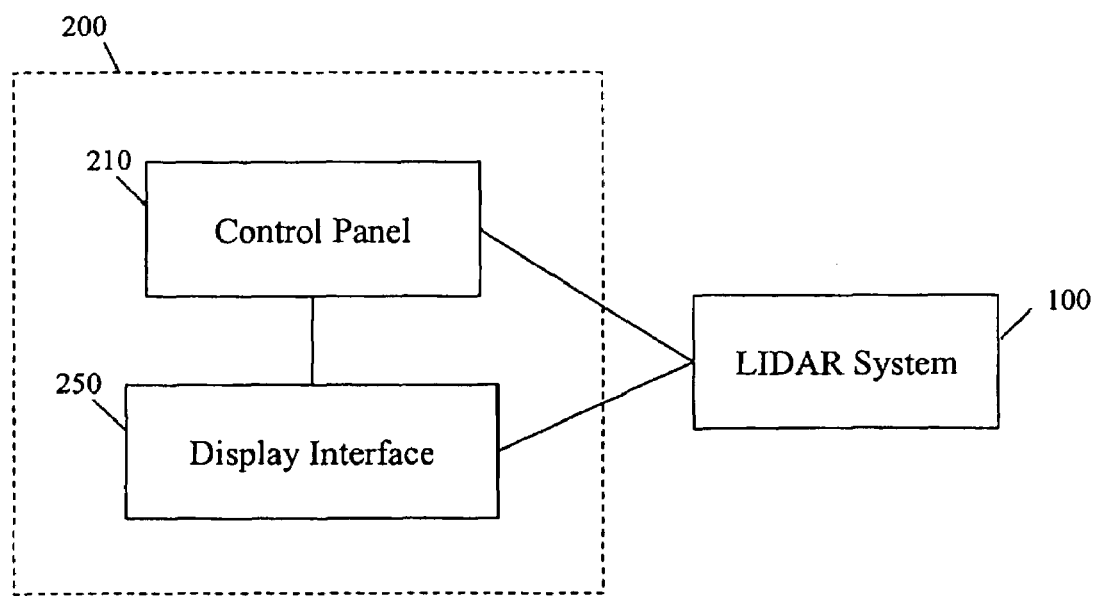
FIG. 2 depicts an exemplary crew interface according to the invention.

An exemplary crew interface 200 is illustrated in FIG. 2 and includes a control panel (or controller) 210 and a display interface 250. The control panel 210 in the illustrated embodiments is the mechanism for the flight crew to enter information to be used by the system and/or receive direction from the flight crew as to where to take a visibility reading from and when to take the visibility reading.

Figure 3A:
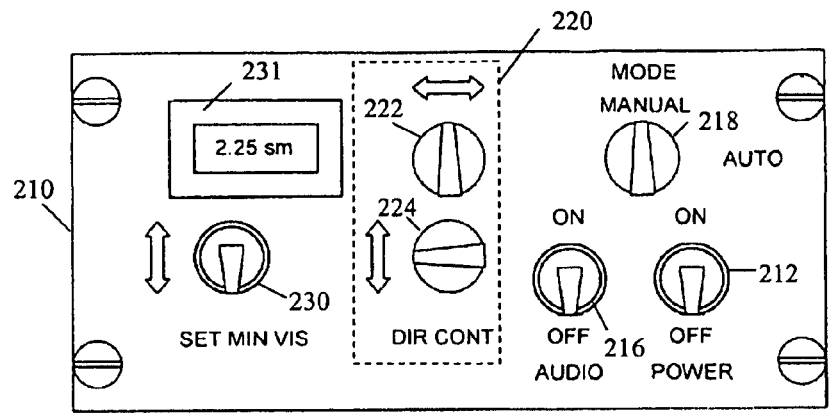
FIG. 3A illustrates an exemplary control head according to the invention.

FIG. 3A illustrates an exemplary control panel 210, which preferably is located, depending on the aircraft type, in a position allowing input of information by the pilot. For example, in military aircraft, the control panel 210 preferably is located on the center console. The illustrated control panel 210 includes a power switch 212, a visibility threshold controller 230, a warning switch 216, a mode switch 218, and a beam controller 220. The power switch 212 maybe a toggle switch as illustrated or any other type of switch, button, or actuation means capable of turning the system on or off.

The visibility threshold controller 230 is illustrated as another toggle switch but alternatively could be a dial, a touch screen, a keypad, or other control mechanism that could be used by the flight crew to set the minimum visibility, which in the illustrated embodiment is 2.25 statute miles (display 231), for a particular flight plan or mission. The visibility range depending upon the implementation could be set at any level of precision such as in a range of 0.01 to 1.00 including the end points, in the illustrated embodiment the visibility may be set in 0.25 statute mile increments. The minimum visibility is provided to an alarm system processor 272 so that when the visibility decreases to the minimum visibility set by the pilot, the flight crew is alerted, for example, visually by a light 274 shown in FIG. 4 or an audio warning. The warning switch 216 as illustrated is a toggle switch for controlling an audio alarm for the flight crew, but in at least one embodiment will control both an audio warning and a visual warning. The warning switch 216 in an alternative embodiment may act like a snooze button in that it deactivates the audio alarm for a period of time.

Figure 3B:
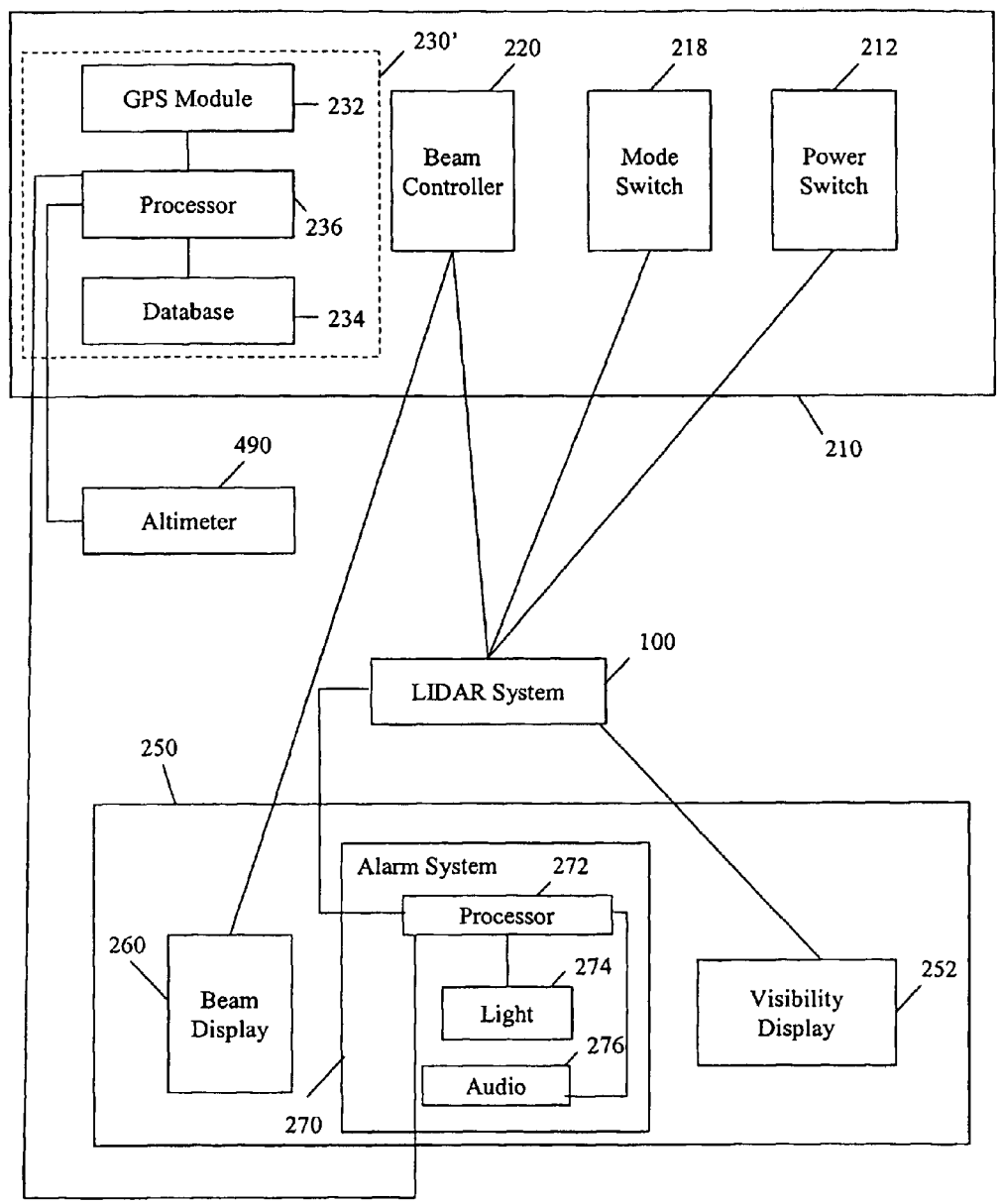
FIG. 3B depicts a block diagram of the system according to the invention.

Alternatively, the visibility threshold control 230' includes a GPS module 232, a database 234, and a processor 236 as illustrated in FIG. 3B, which also illustrates the system without the warning switch 216. The GPS module 232 determines the geographical location of the aircraft, which is provided to the processor 236, using known GPS techniques and communication with orbiting GPS satellites. The geographical location together with the current altitude (obtained from the aircraft instrument readings 490) is crossed referenced with the database 234 by the processor 236 to determine the minimum visibility threshold based on predetermined criteria such as the FAA regulations, military regulations or other governmental regulations that dictate certain visibility requirements based upon the airspace occupied by the aircraft. The processor 236 in effect can take the place of providing the visibility setting that was provided by the toggle switch 230 illustrated in FIG. 3A or be an automated option activated by the flight crew in addition to the visibility threshold control 230.

The mode switch 218 allows the flight crew to select a manual (MANUAL position) or automatic (AUTO position) mode, because this system operates using an active laser beam, it has the ability to be detected by certain sensors. Therefore, in a benign (no threat) environment, the flight crew could select the AUTO mode and receive continuous visibility readings. On the other hand, in a high threat environment and to avoid (or at least lessen the likelihood of) enemy detection, the flight crew may chose to operate in the manual mode, whereas readings are taken only when the pilot deems it necessary by using an activation switch, button, or other trigger mechanism. Alternatively, the mode switch 218 may be omitted particularly in a civilian version where there would be less likely to have the aircraft entering a threat environment. For those occasions, the flight crew could turn the system on and off with the power switch 212 to replicate the mode switch 218.

The beam controller 220 as illustrated includes a direction controller 222 and an elevation controller 224 both of which are illustrated as knobs. The beam controller 220 allows the flight crew to check the visibility readings in an area other than that directly in front of the aircraft. For example, if the visibility ahead has decreased below acceptable levels (or approaching the acceptable visibility threshold), the flight crew will be able to check the visibility to the left and right and at different elevations relative the front of the aircraft to determine if a change in altitude and/or direction would lead to better visibility such that the flight could continue without changing the flight course and/or mission of the aircraft.

Figure 4A:
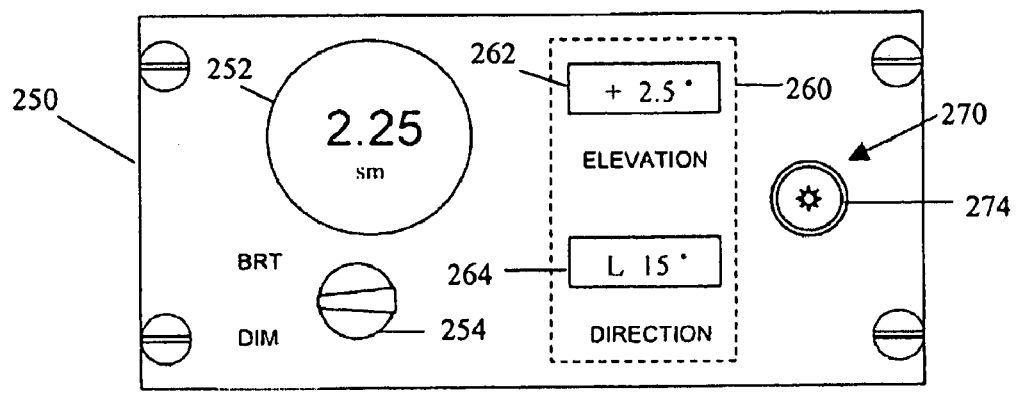
FIGS. 4A and 4B depict exemplary display interfaces according to the invention.

An exemplary display interface 250 is illustrated in FIG. 4A, which most likely would be located on the aircraft's instrument panel. The illustrated display interface 250 includes a visibility display 252, a brightness control knob 254, a beam display 260, and an alarm system 270. The visibility display 252 is illustrated as a digital readout in 0.25 statute mile increments; however, the precision for the system and of the readout preferably is in a range of 0.01 to 1.00 including the end points. The visibility display 252 could be an analog display or gauge or any other type of display able to provide visibility range information to the flight crew.

The brightness control know 254 allows the flight crew to switch the brightness level of the digital version of the visibility display 252, and as one of ordinary skill in the art will appreciate based on this disclosure the brightness control knob 254 could be omitted from the system.

Figure 4B:
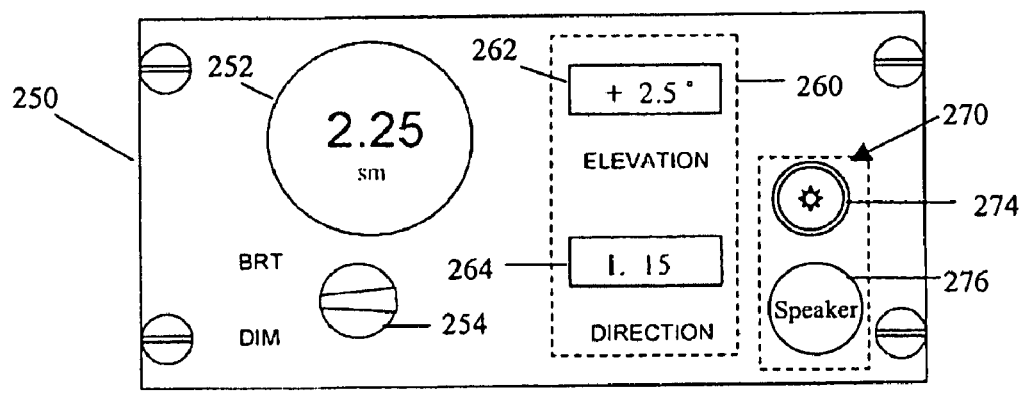

The beam display 260 as illustrated includes information about the direction of the LIDAR beam in elevation (up and down) on display 262 and direction (left and right) on display 264 relative to the aircraft's nose. Although the beam display 260 is illustrated as a digital display, a variety of other types of displays or gauges may be used to display this information. The illustrated alarm system 270 includes a minimum visibility warning light 274, which is an example of a visual notification element, that preferably is activated whenever the minimum visibility is reached or alternatively once the visibility is less than the minimum visibility as determined by the processor 272. The alarm system 270 may alternatively or in addition include a speaker 276 for an audio alarm as illustrated in FIG. 4B, although the audio alarm may be routed through a cockpit speaker or at least one flight crew headset. The speaker and routing of the audio alarm through a cockpit speaker or a headset are examples of an audio notification element. The alarm system 270 alternatively may provide differing alarms as the visibility threshold is approached to provide the flight crew advance warning of worsening visibility conditions.

Alternatively, the visibility display 252 and/or beam display 260 may be included as part of a head-up display in addition or instead of on the control panel 210 and/or the display interface 250. Additionally, the other information displays of this invention may also be routed through a head-up display for viewing by the flight crew.

Figure 5:
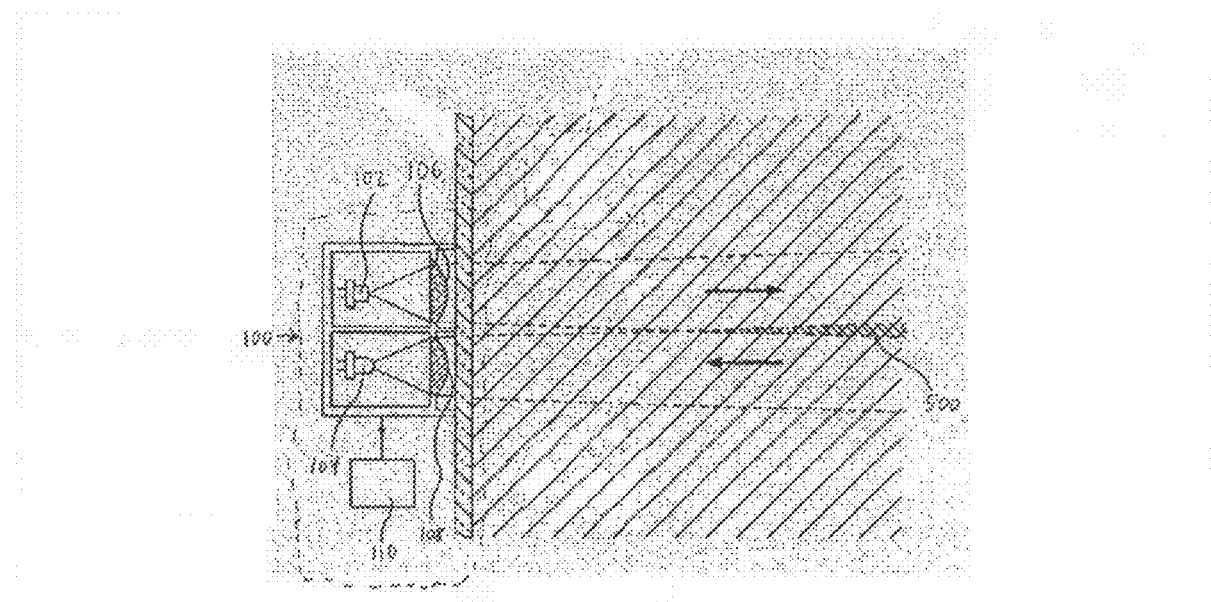
FIG. 5 illustrates an exemplary LIDAR system arrangement capable of working in the invention.

FIG. 5 shows an exemplary arrangement for the LIDAR system 100 that measures the visibility range in front of the aircraft, which operate using known LIDAR principles. The LIDAR system 100 includes a transmitting element 102 (e.g., an infrared laser diode or other infrared source) which radiates light pulses from the aircraft, preferably the nose area of the aircraft, into the region in front of the aircraft including a pilot selected direction, and at least one optical receiving element 104 such as a PIN diode or other photodetector that receives the light, backscattered from the scattering medium (e.g. rain, fog, snow, smoke, etc.) and converts it into an electrical signal. In at least one embodiment, the light pulses may be radiated in any direction. The transmitting element 102 preferably will produce a light in the infrared wavelength range, and more preferably about 1.5 µm. The 1.5 µm wavelength allows for the light to not be attenuated as much during its travel by water droplets, water vapor, carbon dioxide, and oxygen present in the atmosphere. This wavelength also is a minimal risk of causing an eye injury. The illustrated embodiment further includes in front of optical transmitting element 102 and in front of optical receiving element 104 are focusing lenses 106 and 108, respectively, to restrict the emitted light to a spatially bounded light beam and to focus the backscattered light onto receiving element 104. One of ordinary skill in the art will appreciate that in addition to lens, filters may be present on the transmission and/or receiving paths of the LIDAR system 100. The optical elements of the LIDAR system 100 preferably are housed in a turret (or pod) that is capable of allowing the optics to be rotated and aimed at different elevations and in different directions. Alternatively, a mirror system may be used to aim the LIDAR beam at the desired elevation and direction. The spatial bounding of the two light beams denoted by arrows is indicated in FIG. 5 by broken lines.

The optical axes of transmitting element 102 and of receiving element 104 are aligned with respect to one another in such a way that the transmitting beam and the receiving beam form an overlapping region 500 which is shown as the cross-hatched area in FIG. 5. Thus, receiving element 104 captures the part of the emitted light which is backscattered from the scattering medium, indicated in FIG. 5 by a diagonal hatching, in overlapping region 500. The time dependence of the amplitude of the backscatter light received by receiving element 104 is in a direct relationship to the distance of the space zone from which the backscattered light comes. Connected to receiving element 104 is an evaluation unit 110 which determines the visibility range in the region in front of the aircraft based on the output signal of receiving element 104 representing the received backscattered light.

Figure 3C:
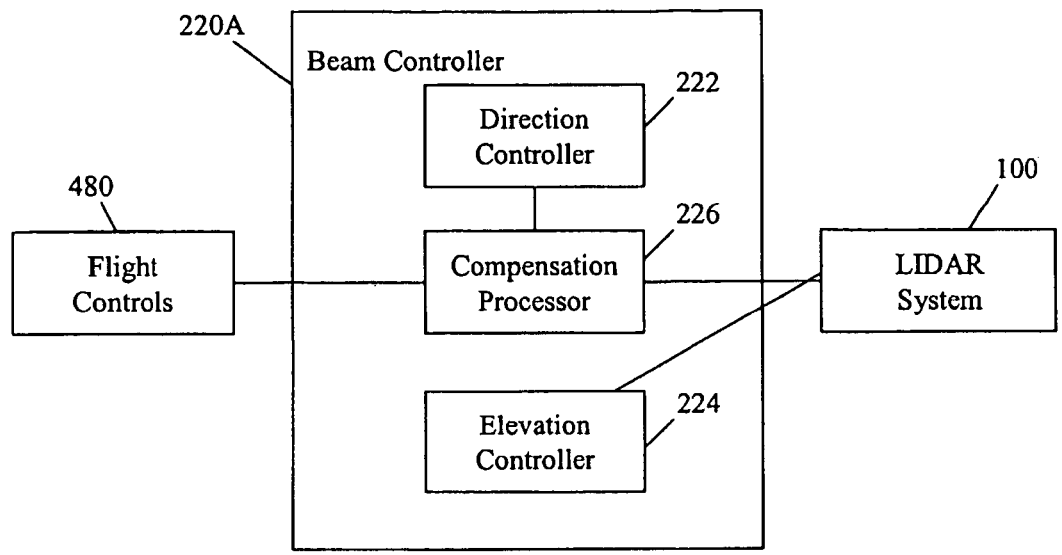
FIGS. 3C and 3D illustrate block diagrams of the beam controller according to the invention.

FIG. 3C illustrates an exemplary beam controller 220A that is connected to the flight controls 480 of the aircraft such that the LIDAR beam is continually aimed at a selected heading (or direction). To accomplish this, the beam controller 220A includes a compensation processor (or means for maintaining the LIDAR beam on a selected heading) 226. The compensation processor 226 receives the selected radial direction from direction controller 222 and the current heading of the aircraft from the flight controls 480, and calculates a selected heading such that the radial direction is continually updated through a turning maneuver based on signals received from the flight controls 480. The compensation processor 226 provides the radial direction to the LIDAR system 100 such that it rotates to maintain the laser beam on the desired heading. But when the aircraft is not performing a turning maneuver, the compensation processor 226 forwards along the selected radial direction without modification. The compensation processor 226 in an alternative embodiment maintains a desired elevation instead of the desired direction or in addition to the desired direction.

Figure 3D:
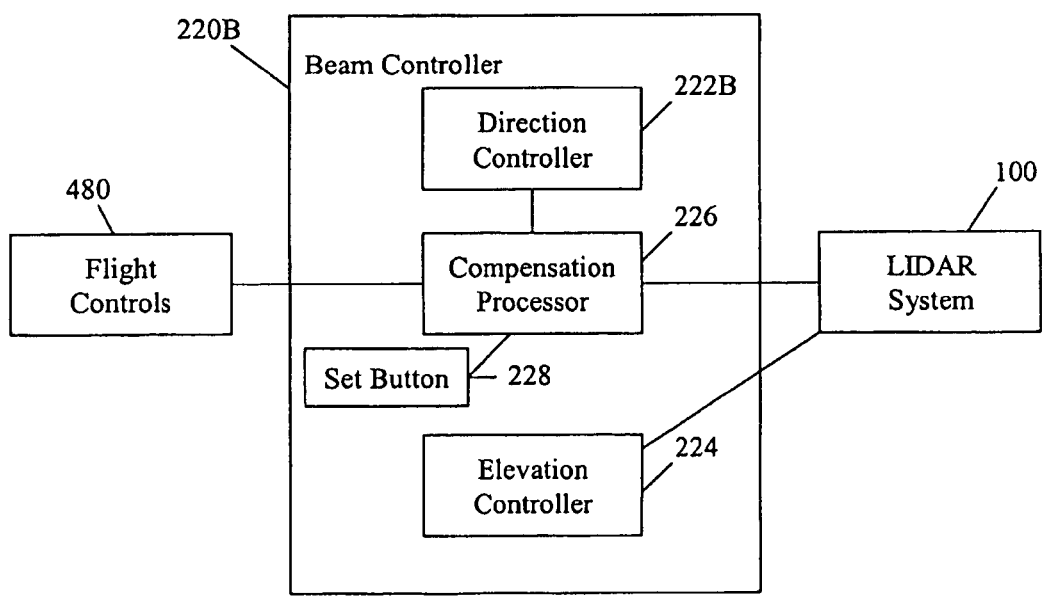

Another exemplary beam controller 220B is illustrated in FIG. 3D with a direction controller 222B that allows entry of a direction for the LIDAR beam to aim no matter the actual aircraft heading. For example, if the aircraft is headed north, the pilot would be able to set the LIDAR beam to be directed towards the northeast and even if the aircraft changed direction to the northwest (or some other direction), the LIDAR beam would be directed towards the northeast. The direction controller 222B preferably is a dial or a keypad that allows entry of a heading for the LIDAR system 100 to face and the compensation processor 226 takes this as the direction and maintains the direction through maneuvers performed by the aircraft similar to the processing of the above exemplary embodiment. The illustrated beam controller 220B includes a set button (or any other actuation component) 228 to instruct the compensation processor 226 as to whether the selected direction is to be a fixed direction for the LIDAR system 100.

The LIDAR system 100 in an alternative embodiment includes the ability to vary the wavelength of the light outputted, preferably in a random pattern. The varying of the light wavelength will increase the difficulty for other entities to detect the use of the system and thus the aircraft using it.

Figure 6:
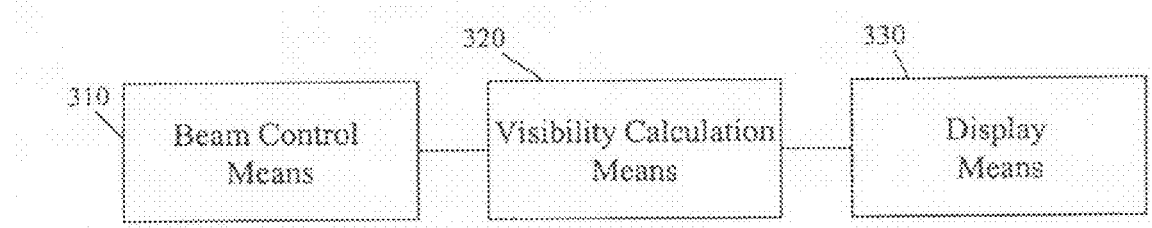

FIG. 6 illustrates an exemplary embodiment of the invention that includes a beam control means 310, a visibility calculation means 320, and a display means 330. The beam control means 310 is a means for receiving selection of a direction and an elevation to take a visibility reading. As discussed above, the various exemplary beam controllers 220, 220A, 220B are capable of performing this function. The visibility calculation means 320 is a means for calculating the visibility reading in the selected direction and at the selected elevation. As discussed above, the LIDAR system 100 is capable of performing this function. The display means 330 is a means for displaying the calculated visibility reading, the direction of the visibility reading, and the elevation of the visibility reading. As discussed above, the display interface 250 and more particularly the visibility display 252 and the beam display 260 are capable of performing this function as part of the display interface 250 and/or a head-up display.

Figure 7:
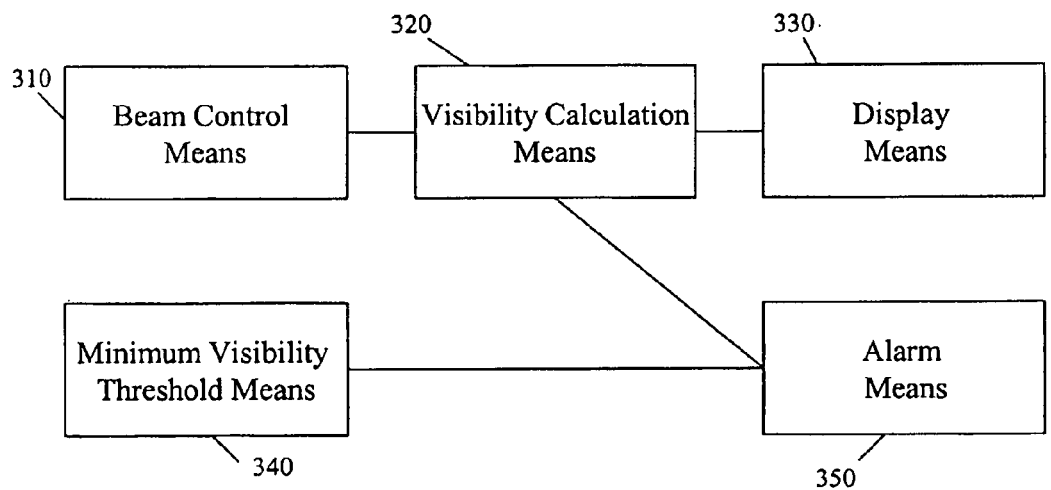
FIGS. 6 and 7 depict exemplary block diagrams according to the invention.

FIG. 7 illustrates a further exemplary embodiment of the invention that includes a beam control means 310, a visibility calculation means 320, a display means 330, a minimum visibility threshold means 340, and an alarm means 350. The minimum visibility threshold means 340 is a means for setting the minimum visibility range that is allowed for a given flight plan and/or mission. As discussed above, the visibility threshold control 230 and 230' are each capable of performing this function. The alarm means 350 is a means for notifying at least one member of the flight crew that either the threshold has been reached and/or gone below. As discussed above, the alarm system 270 is capable of performing this function.

The invention also includes a method for providing an airborne visibility indication to a flight crew as illustrated in FIG. 8. Illustrated step S810 is receiving a minimum visibility threshold. The minimum visibility threshold, for example, can be entered by the flight crew, a predetermined value, or a generated threshold depending on the airspace in which the aircraft is crossing (or scheduled to cross). Illustrated step S820 is taking (or measuring) a visibility range (or reading), and then illustrated step S830 is providing the visibility reading to the flight crew. Illustrated step S840 is a determination whether the visibility reading is less than (or alternatively equal to) the received minimum visibility threshold, and when this determination is yes, notifying at least one member of the flight crew of this occurrence. Steps S820-S840 preferably are repeated multiple times even if the threshold is crossed.

FIG. 9 illustrates an exemplary method according to the invention. The illustrated method begins with receiving a minimum visibility threshold, step S810. The method includes receiving a beam elevation and direction, step S915. The method includes taking a visibility reading at a location identified by the received beam elevation and direction, step S920. Providing the visibility reading and the beam elevation and direction to the flight crew, step S930. Determining whether the visibility reading is less than (or alternatively equal to) the received minimum visibility threshold, and when this determination is yes, notifying at least one member of the flight crew of this occurrence, step S840. Steps S920, S930, and S840 preferably are repeated multiple times even if the threshold is crossed with interruption possible by step S915 to change the location of the visibility reading.

Under either method illustrated in FIGS. 8 and 9, the notifying step S840 can include visual notification such as a flashing light source and/or an audio notification through a speaker and/or headset of at least one of the flight crew.

A proof of concept investigation was done to confirm that an airborne visibility indicator would impact pilot behavior and be a useful tool. The investigation included eight pairs of pilots flying two simulations of about forty-five minutes replicating a predetermined tactical mission under VFR with a simulated worsening of visibility range during the flight in a helicopter flight simulator. Half of the flight crews flew their first mission with a visibility indicator, while the other half of the flight crews flew their first mission without a working visibility indicator. A second simulation (using the same flight profile as the first simulation) was performed no sooner than one week later with or without a visibility indicator (opposite to the flight crew's first simulation flight) to minimize any sequence or recency effects such as correlation and/or familiarity with terrain and degrading visibility. The investigation found that the flight crews flying without the visibility indicator were more likely to discuss and continually analyze the visibility situation much to the detriment of performing other flight control functions such as performing precise navigation, scanning the horizon for trouble spots, air traffic control communication, and fuel management procedures. In general, the flight crews were distracted by the need to subjectively determine the current visibility outside the helicopter compared to the flight crews flying the simulation with the visibility indicator. A majority of the pilots reported that the visibility indicator affected, in a positive manner: 1) their ability to recognize conditions which may cause spatial disorientation, 2) their ability to make mission decisions, 3) their overall situational awareness, and 4) their crew coordination. Additionally, fourteen of the participating pilots indicated that it would be useful to have a visibility indicator in the cockpit during flight to provide an objective measure of visibility during flight.

As will be appreciated by one of ordinary skill in the art, the present invention may be embodied in its entirety or partially as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, or other storage devices.

Computer program code for carrying out operations of the present invention may be written in a variety of languages. However, consistent with the invention, the computer program code for carrying out operations of the present invention may also be written in other conventional procedural programming languages.

The present invention as described above with reference to block diagrams and flowchart illustrations of methods, apparatus (or systems) and computer programs in accordance with several embodiments of the invention. It will be understood that blocks of the flowchart illustrations and block diagrams, and combinations of blocks in the flowchart illustrations and block diagrams, can be implemented by computer program instructions (means for performing the contents of the block). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means or program code that implements the function specified in the flowchart block or blocks.

The computer program instructions may also be loaded, e.g., transmitted via a carrier wave, to a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The exemplary and alternative embodiments described above may be combined in a variety of ways with each other. Furthermore, the steps and number of the various steps illustrated in the Figures may be adjusted from that shown.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The foregoing description describes different components of exemplary embodiments being "connected" to other components. These connections includes physical hardwired connections, wireless connections, magnetic connections, and other types of connections capable of carrying digital and/or analog information between the components.

Although the present invention has been described in terms of particular embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the embodiments described above can be configured without departing from the scope and spirit of the invention. Therefore, it is to be understood that, within the scope of the appended claims, the invention may be practiced other than as specifically described herein.

We claim:

1. An airborne visibility indicator system for use in an aircraft comprising:
   a LIDAR system; and
   a flight crew interface connected to said LIDAR system, said flight crew interface including
      a controller connected to said LIDAR system, said controller includes a visibility threshold controller and a beam controller in communication with said LIDAR system, said beam controller includes means for receiving directional information from a flight crew, and
      a display interface connected to said LIDAR system and said controller.

2. An airborne visibility indicator system for use in an aircraft comprising:
   a LIDAR system, and
   a flight crew interface connected to said LIDAR system, said flight crew interface including
      a controller connected to said LIDAR system, said controller includes a visibility threshold controller and a beam controller in communication with said LIDAR system, said beam controller includes a horizontal controller and an elevation controller, and
   a display interface connected to said LIDAR system and said controller, said display interface is in communication with said visibility threshold controller.

3. The system according to claim 2, wherein said beam controller includes a compensation processor connected to said horizontal controller and said LIDAR system.

4. The system according to claim 1, wherein said controller includes a mode switch in communication with said LIDAR system, the mode switch includes at least two positions with one position for continuous operation of said LIDAR system and a second position for manual operation of said LIDAR system by a flight crew.

5. The system according to claim 1, wherein said display interface includes a visibility display connected to said LIDAR system.

6. An airborne visibility indicator system for use in an aircraft comprising:
   a LIDAR system: and
   a flight crew interface connected to said LIDAR system, said flight crew interface including
      a controller connected to said LIDAR system, said controller includes a visibility threshold controller and a beam controller in communication with said LIDAR system, and a display interface connected to said LIDAR system and said controller, said display interface is in communication with said visibility threshold controller, said display interface includes
a visibility display connected to said LIDAR system, and
a beam display connected to said beam controller.

7. The system according to claim 6, wherein said display interface includes an alarm system connected to said visibility threshold controller, said alarm system having at least one of a visual notification element and an audio notification element that is activated when a visibility is less than a minimum visibility set by said visibility threshold controller.

8. An airborne visibility indicator system for use in an aircraft comprising:
a LIDAR system; and
a flight crew interface connected to said LIDAR system, said flight crew interface including
a controller connected to said LIDAR system, said controller includes a visibility threshold controller, said visibility threshold controller includes
a GPS module,
a processor connected to said GPS module and said display interface, and
a database connected to said processor;
a display interface connected to said LIDAR system and said controller, said display interface is in communication with said visibility threshold controller; and
an alarm system connected to said processor and said LIDAR system.

9. An airborne visibility indicator system for use in an aircraft operated by a flight crew, the system comprising:
beam control means for receiving selection of a direction and an elevation to take a visibility reading,
visibility calculation means for calculating the visibility reading in the selected direction and at the selected elevation, and
display means for displaying the calculated visibility reading, the direction of the visibility reading, and the elevation of the visibility reading.

10. The system according to claim 9, further comprising
a minimum visibility threshold means for setting the minimum visibility range for a given flight plan and/or mission, and
an alarm means for notifying at least one member of the flight crew that the calculated visibility is less than or equal to the minimum visibility range.

11. The system according to claim 9, wherein said beam control means includes means for maintaining the selected direction during a maneuver by the aircraft.

12. A method for providing an airborne visibility indicator to a flight crew comprising:
receiving a minimum visibility threshold through a flight crew interface,
receiving a beam elevation and direction through the flight crew interface,
measuring a visibility range with an aircraft mounted LIDAR system aimed based on the received elevation and direction,
providing the visibility range to the flight crew on a display, and
when the visibility range is less than or equal to the received minimum visibility threshold as determined by a computer, notifying at least one member of the flight crew of this occurrence.

13. A method for providing an airborne visibility indicator to a flight crew comprising:
receiving a minimum visibility threshold through a flight crew interface,
receiving a beam elevation and direction through the flight crew interface,
measuring a visibility range with an aircraft mounted LIDAR system at the received elevation and direction,
providing the visibility range to the flight crew, and
when the visibility range is less than the received minimum visibility threshold, notifying at least one member of the flight crew of this occurrence.

14. The method according to claim 13, wherein said measuring step, said providing step, and said determination are repeated a plurality of times.

15. A method for providing an airborne visibility indicator to a flight crew comprising:
receiving a minimum visibility threshold, wherein the minimum visibility threshold is received from a controller performing the following method
receiving a geographical location of the aircraft,
receiving an altitude for the aircraft,
correlating the geographical location and the altitude with the minimum visibility threshold in a database, and
providing the minimum visibility threshold; and
measuring a visibility range with an aircraft mounted LIDAR system;
providing the visibility range to the flight crew; and
when the visibility range is less than or equal to the received minimum visibility threshold, notifying at least one member of the flight crew of this occurrence.

16. The method according to claim 13, further comprising:
compensating for an aircraft turn towards the received direction such that the direction used to take the visibility range is adjusted such that the direction of the visibility range remains constant throughout the aircraft turn.

17. The method according to claim 13, wherein said receiving the beam elevation and direction step occurs when a new beam elevation and/or direction is entered by the flight crew interrupts a repeating loop of said measuring step, said providing step, and said determination.

18. The method according to claim 17, further comprising:
compensating for an aircraft turn towards the received direction such that the direction used to take the visibility range is adjusted such that the direction of the visibility range remains constant throughout the aircraft turn.

19. The system according to claim 9, further comprising
a minimum visibility threshold means for setting the minimum visibility range for a given flight plan and/or mission, and
an alarm means for notifying at least one member of the flight crew that the calculated visibility is less than or equal to the minimum visibility range.

20. The system according to claim 6, wherein said beam controller includes a horizontal controller and an elevation controller.

* * * * *